(12) United States Patent
Hogben et al.

(10) Patent No.: US 9,405,451 B2
(45) Date of Patent: *Aug. 2, 2016

(54) SYSTEM AND METHOD FOR CONTROLLING THE PROGRESSION OF MULTIMEDIA ASSETS ON A COMPUTING DEVICE

(71) Applicant: Fabrizio Ferri Photography, New York, NY (US)

(72) Inventors: William Hogben, New York, NY (US); Fabrizio Ferri, New York, NY (US)

(73) Assignee: FABRIZIO FERRI PHOTOGRAPHY, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,146

(22) Filed: Sep. 21, 2015

(65) Prior Publication Data

US 2016/0011762 A1    Jan. 14, 2016

Related U.S. Application Data

(63) Continuation of application No. 13/630,178, filed on Sep. 28, 2012, now Pat. No. 9,141,281.

(51) Int. Cl.
| | | |
|---|---|---|
| *G06F 3/0481* | (2013.01) | |
| *G06F 3/0488* | (2013.01) | |
| *G06F 3/0484* | (2013.01) | |
| *G06F 17/30* | (2006.01) | |
| *G06F 3/01* | (2006.01) | |
| *G06F 3/16* | (2006.01) | |
| *G06T 11/60* | (2006.01) | |
| *G06T 13/80* | (2011.01) | |
| *G11B 27/10* | (2006.01) | |

(52) U.S. Cl.
CPC ............ *G06F 3/04847* (2013.01); *G06F 3/017* (2013.01); *G06F 3/04883* (2013.01); *G06F 3/167* (2013.01); *G06F 17/30017* (2013.01); *G06T 11/60* (2013.01); *G06T 13/80* (2013.01); *G11B 27/102* (2013.01)

(58) Field of Classification Search
CPC ............ G06F 3/00; G06F 3/01; G06F 3/041; G06F 3/048; G06F 3/0481; G06F 3/0482; G06F 3/04817; G06F 3/04883; G06F 3/0488; G06F 3/016; G11B 27/34; G11B 27/034; H04N 5/44543; G06T 13/40
See application file for complete search history.

(56) References Cited

U.S. PATENT DOCUMENTS

| | | | |
|---|---|---|---|
| 8,482,576 B1 | 7/2013 | Yelsey | |
| 2003/0076347 A1 | 4/2003 | Barrett et al. | |
| 2007/0192739 A1 | 8/2007 | Hunleth et al. | |
| 2010/0179991 A1 | 7/2010 | Lorch et al. | |
| 2011/0314381 A1 | 12/2011 | Fuller et al. | |
| 2013/0307792 A1* | 11/2013 | Andres | G11B 27/005 345/173 |

* cited by examiner

*Primary Examiner* — Xiomar L Bautista
(74) *Attorney, Agent, or Firm* — Leason Ellis LLP

(57) ABSTRACT

A system and method is provided for content presentation. In one or more implementations, at least one processor is operatively coupled to processor readable storage media. Further, at least one database provided with the processor readable storage media includes multimedia content. A first segment of the multimedia content is provided for presentation. At least a second segment and a third segment of the multimedia content are associated with the first segment of the multimedia content. User input is detected while the first segment of the multimedia is being presented, and the input is determined to be associated with the second segment of the multimedia content. The first segment ends, and the second segment is provided. Moreover, additional user input is detected while the second segment of the multimedia is being presented, and which is determined to be associated with the third segment of the multimedia content. The second segment is ended and the third segment of the multimedia content is provided for presentation.

19 Claims, 14 Drawing Sheets

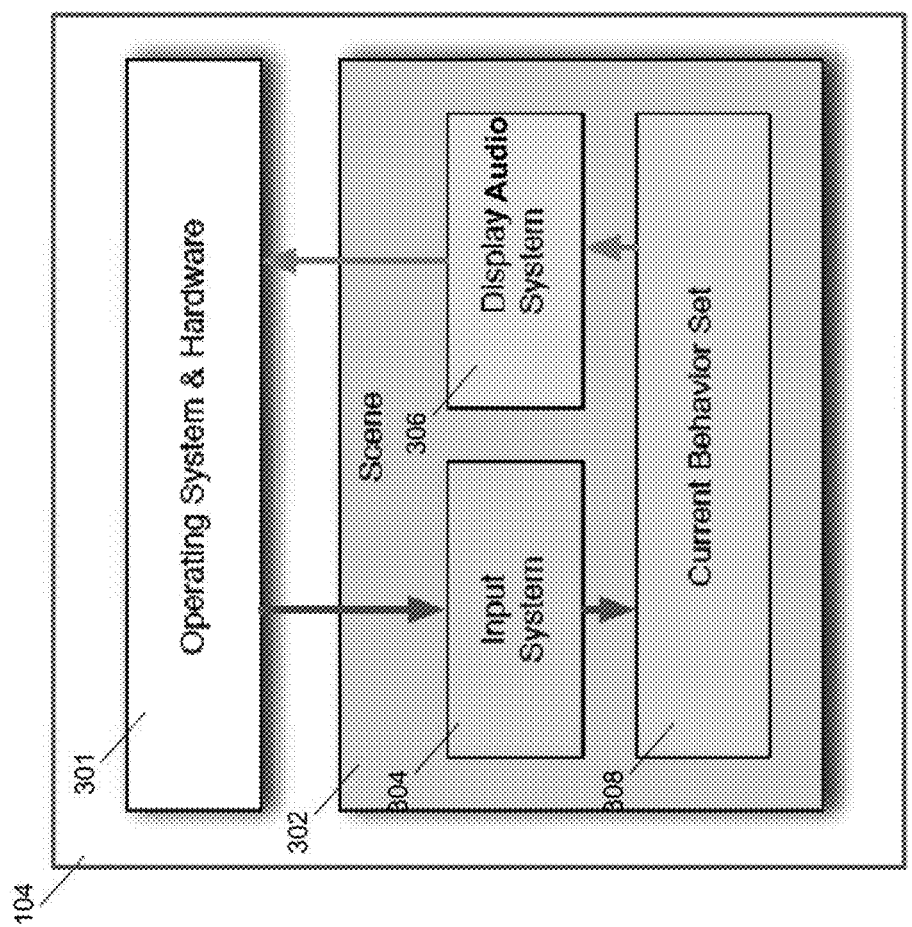

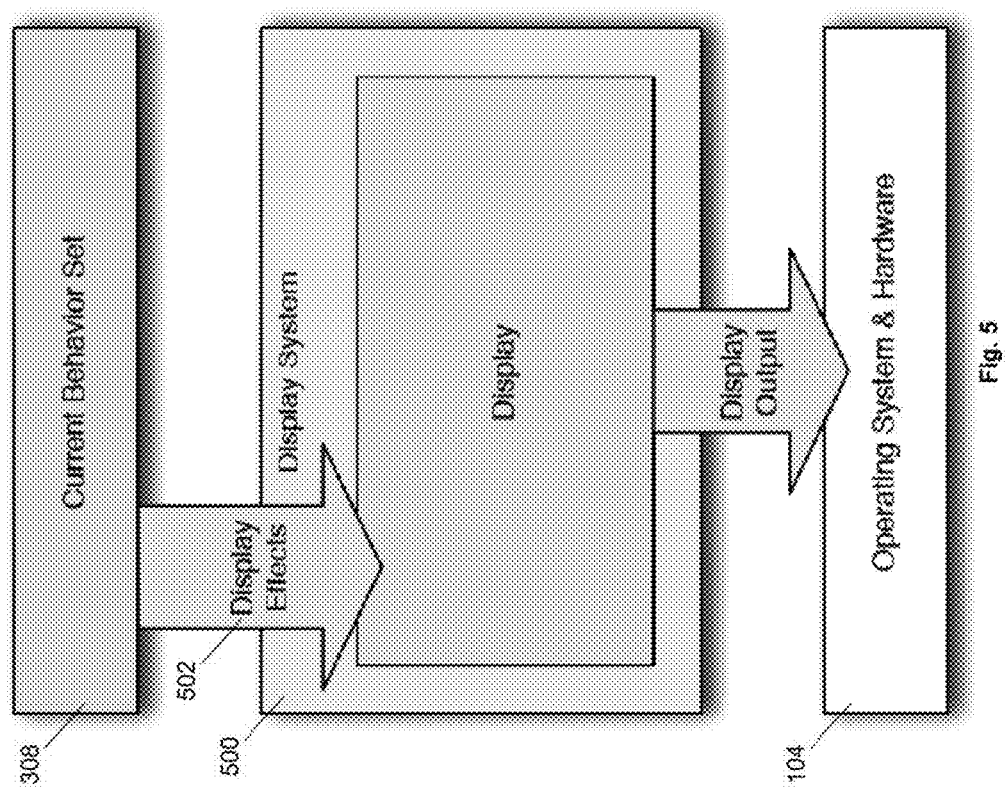

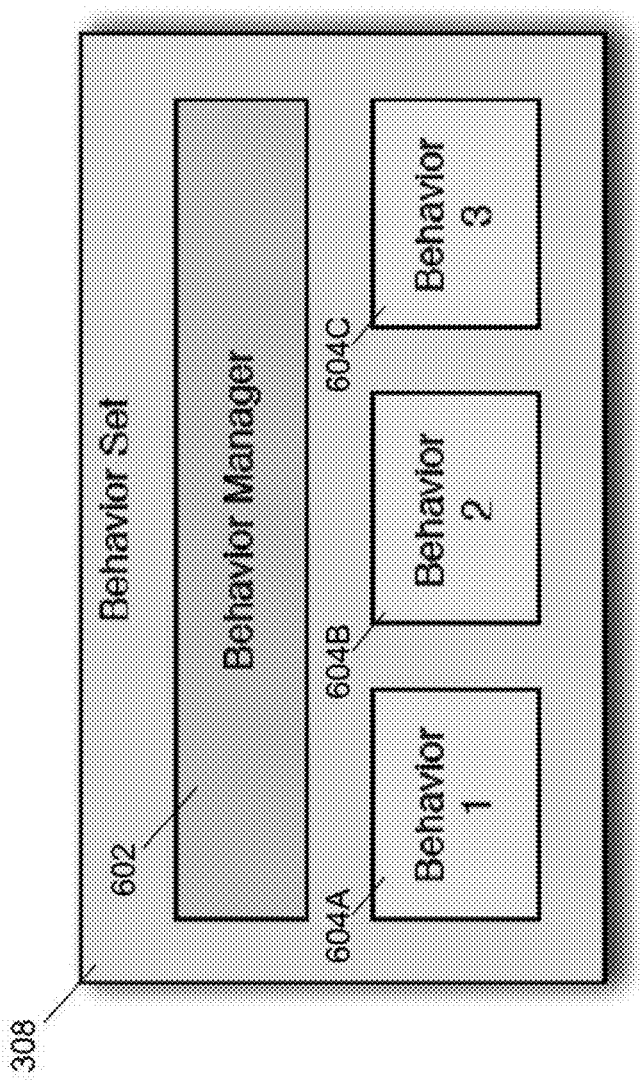

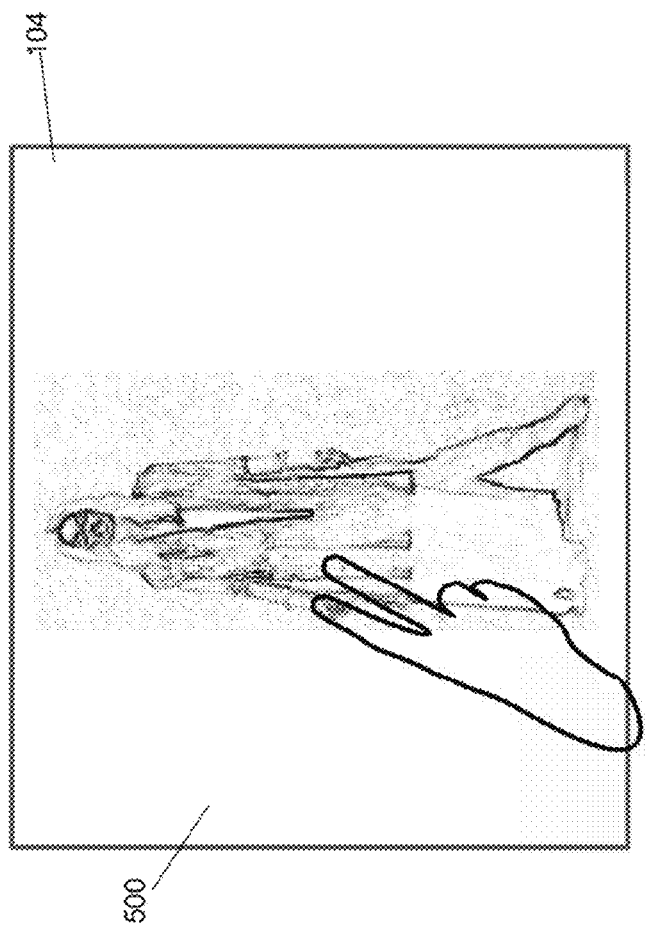

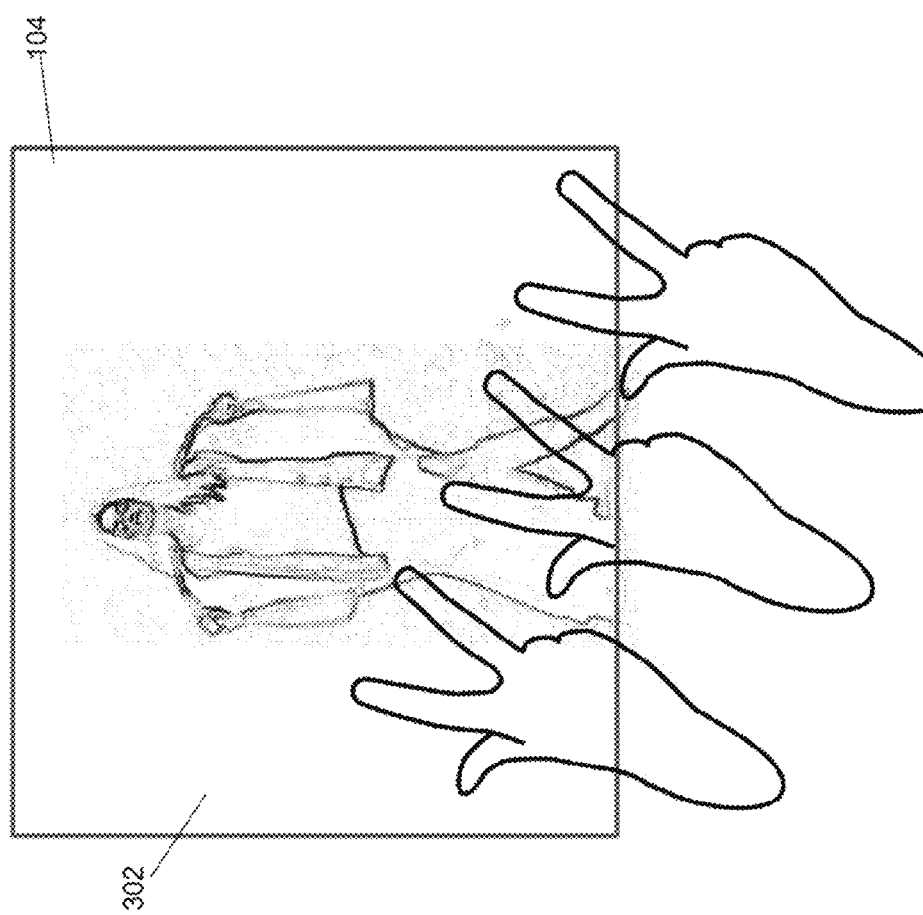

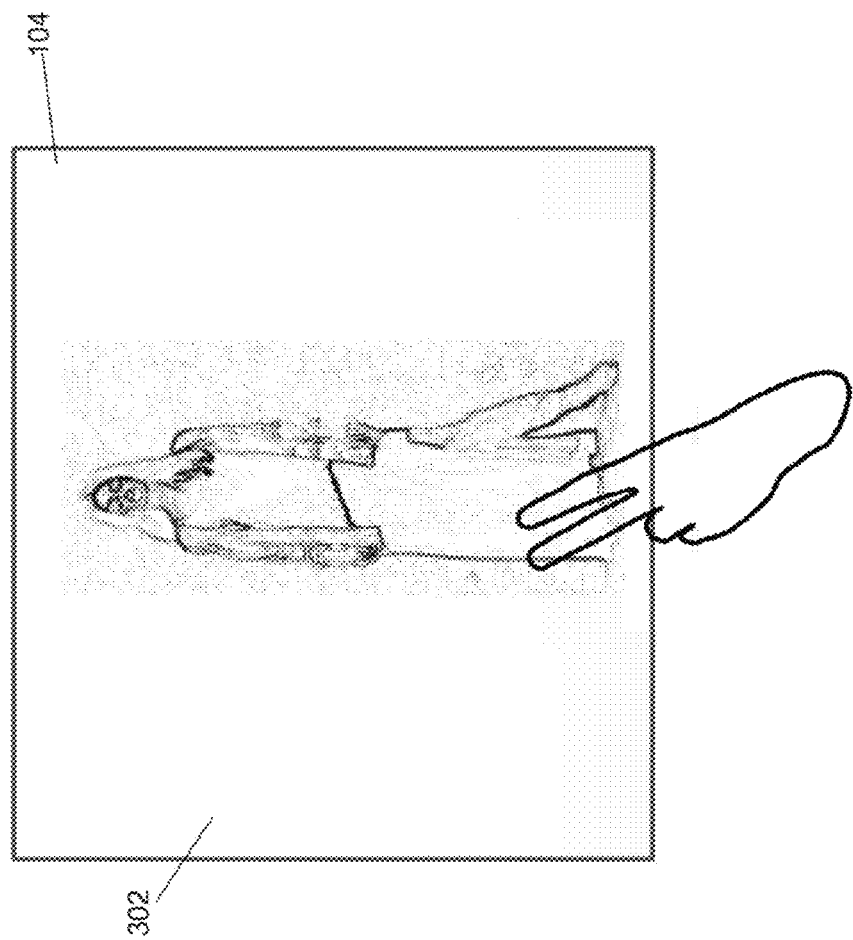

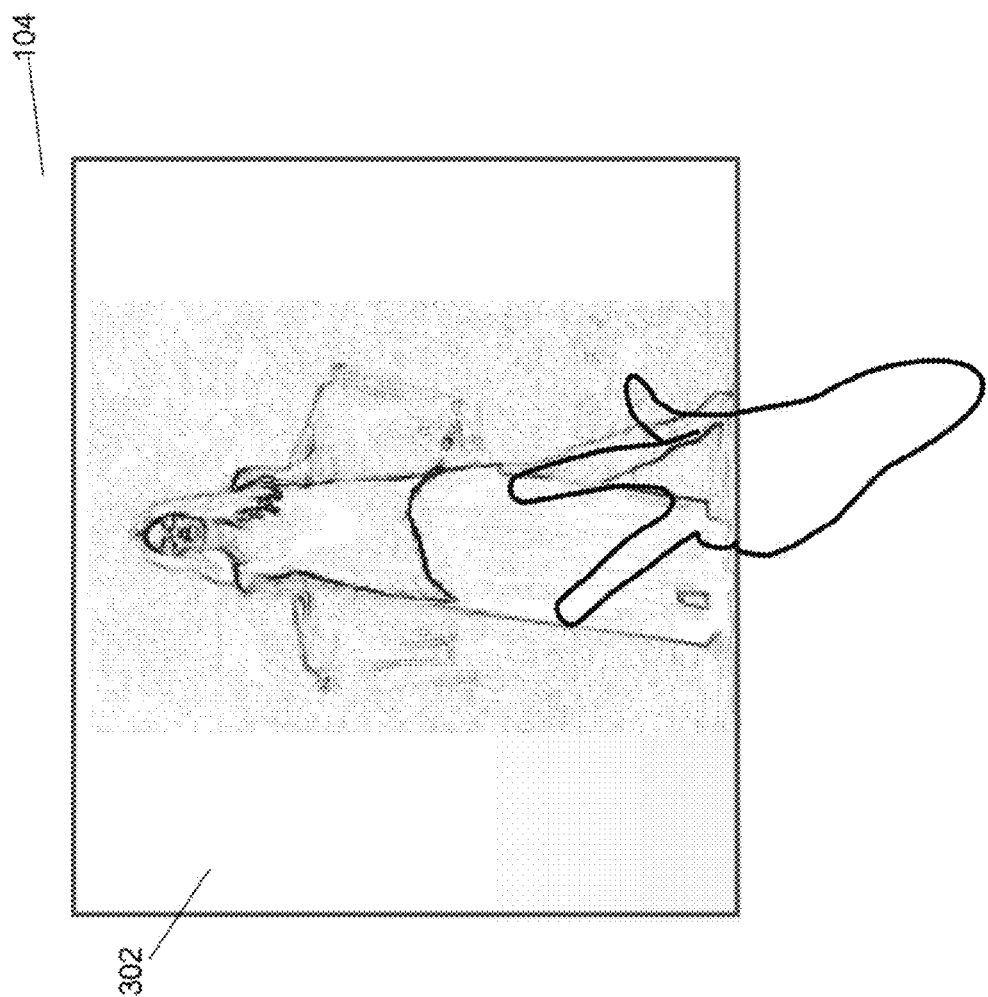

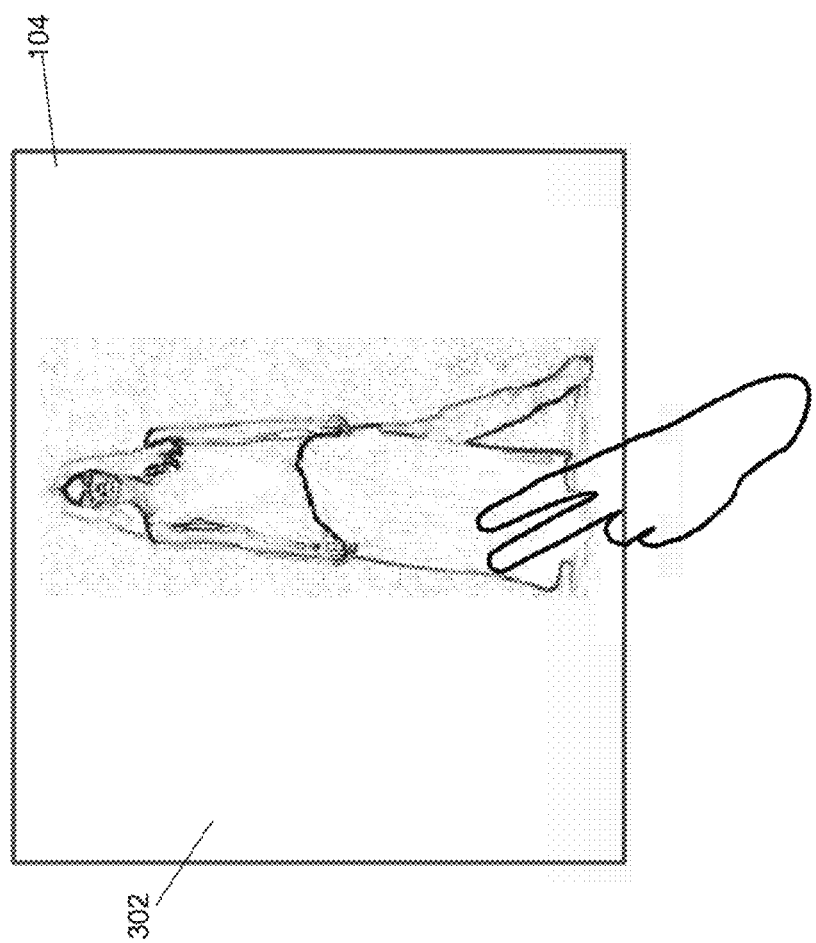

SYSTEM AND METHOD FOR CONTROLLING THE PROGRESSION OF MULTIMEDIA ASSETS ON A COMPUTING DEVICE

FIELD

The present application relates, generally, to communications and, more particularly, to a system and method for providing multimedia assets in an interactive format.

BACKGROUND

Multimedia content, such as video, audio, graphical or the like, is often provided in various computing devices. For example, multimedia content is stored on a computing device and presented in a player application that runs on the computing device. Examples of such player applications include WINDOWS MEDIA PLAYER, QUICKTIME, AMAROK, AUDACIOUS, BANSHEE, MPLAYER, RHYTHMBOX, TOTEM, VLC, AND XINE. Many multimedia player applications are configured with controls that enable the user to interact with the multimedia content. Typical controls provided with such player applications include buttons, sliders and/or switches for commands such as play, pause, stop, rewind or the like.

Although most multimedia player applications include one or more controls for interactivity, realistic multimedia content is being created that may cause users to desire greater interactivity with various forms of multimedia content, such as relating to games and adult entertainment. This desire is fueled, at least in part, by increased interactive functionality supported by many mobile computing devices, such as provided by an IPAD, IPHONE, personal digital assistant, and smart phones, such as running the ANDROID operating system.

Unfortunately, the current state of the interactive experience for many users, particularly with regard to sophisticated multimedia content (e.g., high DEF video content) is not satisfactory due to limitations on the presentation of the content, particularly in response to one or more forms of user input.

SUMMARY

The present application addresses these and other concerns and shortcomings with regard to providing interactive systems and methods for multimedia content.

Accordingly, a system and method is provided for content presentation. In one or more implementations, at least one processor is operatively coupled to processor readable storage media. Further, at least one database provided with the processor readable storage media includes multimedia content. A first segment of the multimedia content is provided for presentation. At least a second segment and a third segment of the multimedia content are associated with the first segment of the multimedia content. User input is detected while the first segment of the multimedia is being presented, and the input is determined to be associated with the second segment of the multimedia content. The first segment ends, and the second segment is provided. Moreover, additional user input is detected while the second segment of the multimedia is being presented, and which is determined to be associated with the third segment of the multimedia content. The second segment is ended and the third segment of the multimedia content is provided for presentation.

Other features and advantages of the present application will become apparent from the following description of the invention that refers to the accompanying drawings.

BRIEF DESCRIPTION OF THE DRAWINGS

FIG. 3 is a block diagram that represents a high level architecture in accordance with an implementation of the present application;

FIG. 5 is a block diagram that illustrates an example display system in accordance with an implementation; and FIGS. 6A through 6C are block diagrams that illustrate a plurality of interactive behaviors in connection with an example behavior set in accordance with an implementation; and FIGS. 7A-7F are illustrations of an example implementation in accordance with the present application.

DESCRIPTION

Figure 2:
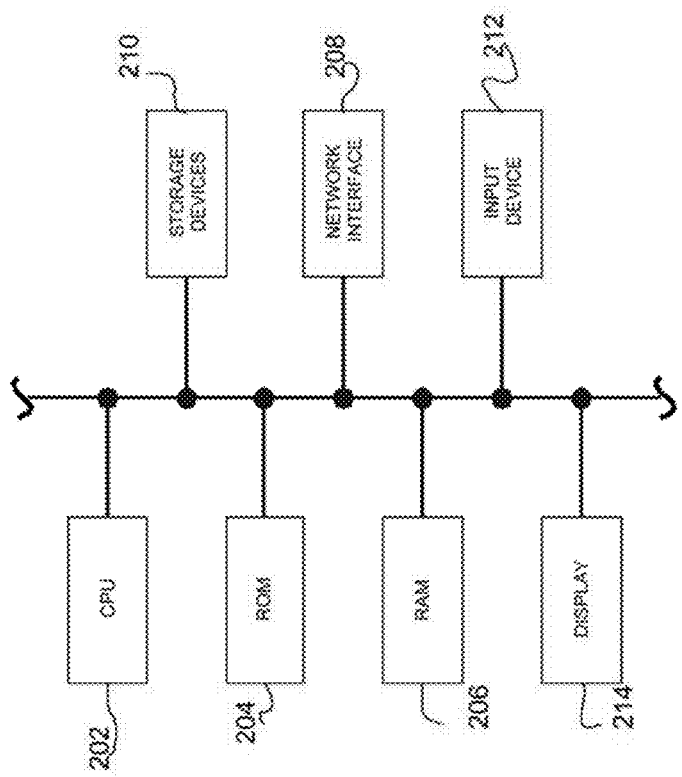
FIG. 2 is a block diagram that illustrates functional elements of a computing device in accordance with an embodiment.

The present application comprises features for multimedia interactivity, including to control video selection and playback, and leverages new and intuitive tools and interfaces. In an implementation, a software application may be installed on a portable computing device, such as a smart phone, tablet computer, personal digital assistant (PDA) or the like, for receiving user commands to control the selection and playback of multimedia content. The user commands may be received via a plurality of various interfaces, such as touch-gestures, sounds, and responses to graphical screen controls, such as buttons, drop list, text boxes, checkboxes or the like. The resulting user experience is a seamless presentation of multimedia content, including sound and video that is more realistic and enjoyable than was previously available.

In an implementation, the present application includes functionality for three aspects: for user input, for evaluating the progression and transition of content, and for selection and display of the content. As used herein, the term "trigger types" refers, generally, to factors of the present application for receiving user input and include, for example, receiving and/or detecting directional gestures, receiving and/or detecting blown air from a user and receiving and/or detecting voice commands. Also as used herein, the term "transition progress evaluator" refers, generally, to technology for detecting respective trigger types, and for accessing and providing corresponding multimedia content or causing appropriate program behavior. Moreover, the term "display technology" refers, generally, to management and control of multimedia content. Display technology also refers to a multimedia player device, such as for audio/video content, and that implements many of the features described herein. Moreover, the term "asset" or "assets" refer, generally, to multimedia content including, but not limited to, video content, audio content, textual content and image content.

In an implementation, the present application provides for controlling multimedia content (i.e. assets) to create an intuitive and real-world experience for the user. The present application accounts for providing assets in sufficiently real detail (such as in high definition or surround sound format) without jeopardizing or sacrificing responsiveness and seamless interactivity.

During presentation of multimedia content, for example using display technology substantially as set forth herein, there are times when no user input is received. In one example, multimedia content is provided to a user in a player device of a female or male model who is fully clothed. During the presentation of the multimedia content, the model is waiting for user input to direct the model to remove an article of clothing. In an implementation, multimedia content referred to generally herein as an "idle," such as a relatively short segment of video content, is repeatedly provided (e.g. the content "loops") until user input is received that interrupts the idle for presentation of a different asset. Alternatively, an idle may be provided or react to user input. For example, an idle may be provided in response to a command received from a user representing a direction for the idle to wait for a period of time. In yet another alternative implementation, and idle may be provided in response to instructions that are provided algorithmically and/or substantially automatically via programming code.

During a period of time when an idle is occurring, user input may be detected representing a command to provide different multimedia content. The different multimedia content may be or otherwise result in a new idle being provided. Continuing with the previous example, the model is wearing a jacket and the user has provided a command to remove the jacket for the model to display a sweater that the model is wearing beneath the jacket. A second idle may be, thereafter, provided that shows the model wearing the sweater with the jacket removed. In order to provide a seamless display and integration of assets, the present application may provide additional content between respective idles. Referred to herein, generally, as "transitions," one or more assets are selected and provided between idles and in proper context, and that represent a fluid termination of one idle and start of another.

In accordance with the present application, particular forms of user input are received and detected that direct appropriate selection of transitions and subsequent idles. When user input is detected, for example, the presentation of an idle may be interrupted and an appropriate transition is selected and displayed. The particular form of user input may drive the selection of a respective transition and/or the subsequent idle that follows. The particular form of user input is referred to herein, generally, as a "transition trigger." An example of transition triggers includes a two-touch gesture on a touch-screen device, wherein two touches move apart from each other, and/or toward each other. Continuing with the previous model example, the transition trigger of a two-touch gesture in which the two touches move apart from each other, represents that the user is directing the model to remove his or her jacket, and which causes the selection of a respective transition and subsequent idle for displaying the model removing his or her jacket.

The present application provides respective implementations in accordance with particular computing devices and corresponding operating system(s) running thereon. One or more transition triggers may be effective in one hardware/software context (e.g., APPLE IPHONE) but not effective on another (e.g., BLACKBERRY). This may be due, at least in part, to limitations and/or features of hardware devices and respective operating systems. Moreover, a plurality of transition triggers may be usable in combination to affect the selection and display of respective transition(s) and idle(s). For example, user input for causing the model in the above example to remote his or her jacket may be implemented by the two-touch gesture or, alternatively, may be implemented by quickly pivoting the user's computing device away from the user and back toward the user, provided that the user's computing device is configured to receive such inputs.

In one or more particular implementations, transitions may progress substantially automatically or, alternatively, may require user input to progress. Further, a transition may be presented and another transition may be automatically selected and displayed immediately thereafter. In yet another implementation, after a transition ends, the previous idle that preceded the transition may resume or be replayed. Thus, the present application supports various automatic contexts for realistic and desirable presentation of assets.

Continuing with the preceding example, and in connection with the model's jacket to sweater transition, as the user's two-touch gesture moves slowly and continually outwards and further in a downward direction, the model slowly removes his or her jacket. As the two-touch gesture slows to a full stop, the model similarly slows to a standstill. Once the jacket is down to the model's fingertips, the jacket falls without any further input received from the user. Thereafter, a subsequent idle may be selected, such as an idle of the model displaying a sweater. Thus, functionality is provided in accordance with the present application, including for providing for respective assets in accordance with corresponding user input (e.g. gestures), and for automatic selection and display of one or more transitions and/or idles based upon appropriate contextual assets.

The present application, in one or more implementations, supports a selection and display of one or more transitions that follow a respective idle. Moreover, the present application supports detection of a plurality of user input commands, such as via gestures, sounds, computing device movements, or the like and, in response to the respective user input, identifies and presents one or more appropriate transitions that correspond thereto. During or shortly after user input is detected during an idle, for example, a determination may be made to identify one or more appropriate transitions and/or idles for selection and presentation. Continuing with the previous example, the model is wearing a shirt in a "shirt idle." As the user makes an upward touch gesture, a selection is made of a transition showing the model lifting the shirt. One or more other touch gestures (i.e., user input) may be detected that results in a selection of a presentation of one or more assets showing the model removing his/her shirt. Alternatively, the user blows into a microphone element provided with the user's computing device, and a transition is selected and presented that shows the model's shirt appearing to blow in the wind. In the first example case involving the touch gestures, after the appropriate transition was selected and presented, a new idle is selected and presented showing the model's shirt removed. In the second example case involving the blowing gesture, after an appropriate transition was selected and presented (e.g., the model's shirt blowing in the wind), the previous idle is presented with the model's shirt on. These examples demonstrate intelligent selection of appropriate content, such as leaving the model's shirt on after a display of a brief gush of wind. Thus, the present application provides for intelligent selections of idles and transitions in connection with complex user input commands, which may be received in a variety of contexts and environments.

In an implementation, user input that is detected during the course of an idle may be filtered through possible triggers in order to recognize the respective trigger the user intended, and to respond accordingly with an appropriate asset. User input, including gestures, noises, selections or the like, may be detected and recognized as not being a transition trigger, per se, or may, alternatively, be combined with one or more other inputs to represent a transition trigger. In an implementation, input that does not activate any trigger may be used by the idle's display. Moreover, when a transition begins, it may take over the display from the idle. These and other features are described in greater detail below, with reference to the corresponding figures.

As noted above, an aspect of the present application regards evaluating the progression of an asset, such as an idle or transition. Referred to herein, generally, as the progress evaluator, input that is received from a user during a transition may be incorporated as the display is updated. In the event of a "bad" input, such as a stray hand movement by the user, a transition that may have been invoked as a result may be aborted, and the previous idle that was presented prior thereto may reappear. In this way, the present application provides for ongoing quality control during the course of presenting assets to a user. In an implementation, when the progress evaluator's conditions are satisfied, control may be passed to the subsequent asset (e.g. transition, idle or the like).

Figure 1:
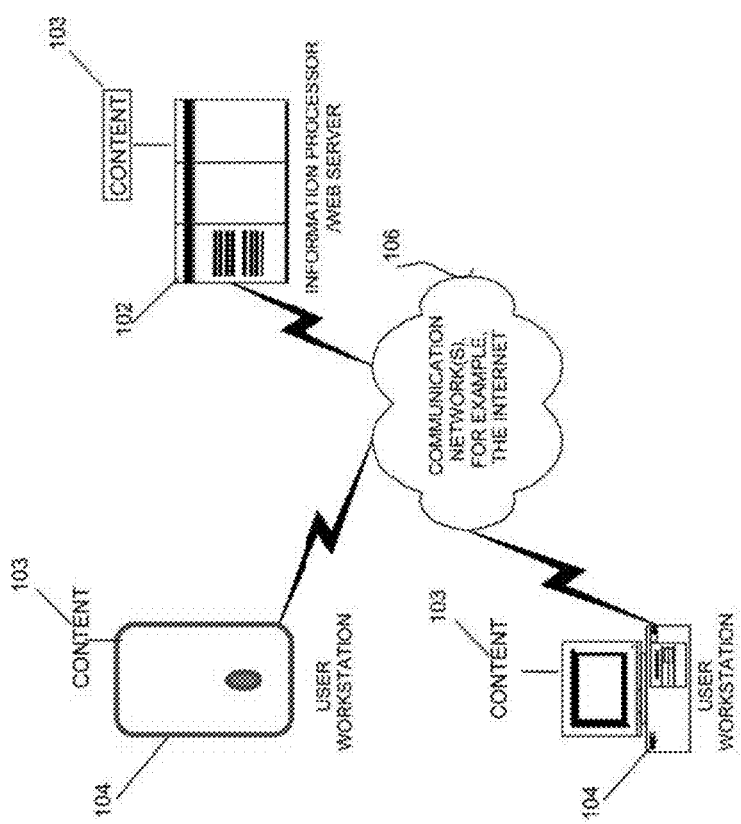
FIG. 1 shows an example hardware arrangement for viewing, reviewing and outputting content in accordance with an implementation.

Referring now to the reference Figures, in which like reference numerals refer to like elements, FIG. 1 shows an example hardware arrangement for viewing, reviewing and outputting content over a communication network, such as the Internet. As shown in FIG. 1, an information processor 102, optionally functioning as an internet web server, provides electronic content 103 to a user workstation 104 that communicates with information processor 102 via communication network 106. Alternatively, content 103 is provided to user workstation 104 without the use of communication network 106. Content 103 includes, for example, text, graphics, pictorial, audio and video material. The user workstation 104 may employ software that enables a communication session to be established between the user workstation 104 and information processor 102. Information processor 102 employs software enabling a communication session, for example an HTTP session, to be established between the user workstation 104 and the information processor 102.

FIG. 2 illustrates the functional elements of information processor 102 and/or user workstation 104, and include one or more central processing units (CPU) 202 used to execute software code and control the operation of information processor 102 and/or user workstation 204, read-only memory (ROM) 204, random access memory (RAM) 206, one or more network interfaces 208 to transmit and receive data to and from other computing devices across a communication network, storage 210 such as a hard disk drive, floppy disk drive, tape drive, CD ROM or DVD for storing program code, databases and application data, one or more input devices 212 such as a keyboard, mouse, track ball, virtual keyboard, touchscreen, microphone and the like, and a display 214.

The various components of information processor 102 and/or user workstation 104 need not be physically contained within the same chassis or even located in a single location. For example, storage device 210 may be located at a site which is remote from the remaining elements of production user workstation 104, and may even be connected to CPU 202 across communication network 106 via network interface 208. In an example embodiment, information processor 102 and/or user workstation 104 includes a memory equipped with sufficient storage to provide the necessary databases, forums, and other community services as well as acting as a web server for communicating hypertext markup language (HTML), Java applets, Active-X control programs or the like to information processor 102 and/or user workstation 104. Information processor 102 and/or user workstation 104 is arranged with components, for example, those shown in FIG. 2, suitable for the expected operating environment of information processor 102 and/or user workstation 104. The CPU(s) 202, network interface(s) 208 and memory and storage 210 are selected to ensure that capacities are arranged to accommodate expected demand. The nature of the present invention is such that one skilled in the art of writing computer executable code (i.e., software) can implement the described functions using one or more of a combination of popular computer programming languages and developing environments including, but not limited to C, C++, Visual Basic, JAVA, HTML, XML, ACTIVE SERVER PAGES, FLASH, JAVA server pages, servlets, and a plurality web site development applications.

It is contemplated herein that any suitable operating system can be used on information processor 102 and/or user workstation 104, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, MAC OS, UNIX, LINUX, PALM OS POCKET PC, IOS, DROID, BLACKBERRY, TIZEN, any other suitable operating system.

As used herein, the term, "module," refers, generally, to one or more discrete components that contribute to the effectiveness of the systems and methods described herein. Modules can include software elements, including but not limited to functions, algorithms, classes and the like. Modules also include hardware elements, substantially as described below. Modules can operate independently or, alternatively, depend upon one or more other modules in order to function.

The system accomplishes this by executing a series of software modules that cooperate to provide the features described herein. Each of the modules may include hardware, firmware, or other software code executing in a processor, or some combination thereof, that configures a machine such as a computing device to implement the functionality described herein. The functionality of these modules can be combined or further separated, as understood by persons of ordinary skill in the art, in analogous implementations of embodiments of the invention.

As used herein, references to displaying data on information processor 102 and user workstation 104 regard the process of communicating data across communication network 106 and processing the data such that the data is viewed on a display 216, for example, by using a web browser and the like. As is known with web browsing software, the display 216 on user workstation 104 presents sites such that a user can proceed from site to site within the system by selecting a desired link.

FIG. 3 is a block diagram that represents a high level architecture 300 in accordance with an implementation of the present application. In the example shown in FIG. 3, computing device 104 is represented to include hardware and an operating system 301. In operative communication with computing device 104 is scene 302. As teams herein, the term "scene" represents an object, such as known in the art, which manages input received from the operating system and hardware and displays output. For example, the scene recognizes input from input system 304, such as touches, tilts, sounds (e.g. from a microphone) and images (e.g. from a camera or other image capturing device provided with computing device 104). Moreover, the scene is configured to receive such input and provide corresponding output via display/audio system 306, such as by displaying video assets or playing audio assets, as appropriate.

Accordingly, the scene is considered herein to be a top level object. In an implementation, the scene manages one or more behavior sets 308. As used herein, the term "behavior set" refers to, generally, a current state of an application. A behavior set encapsulates what a user is permitted to see and hear, as well as what a user is permitted to do. In accordance with one or more rules that may be imposed as a function of respective user rights or other criteria, users you may be entitled to receive particular forms and amounts of content, and further may be entitled to interact there with. For example, users may be offered various fee options. At the lowest cost, users may view the limited amounts of video content, and may interact with such content only in a rudimentary way. At a higher level cost, however, users may be entitled to access significantly more video and audio content, and may be entitled to highly sophisticated interactivity therewith. In this example, behavior sets may be tied to particular user rights. In an implementation, behavior sets may be defined as a function of a particular context associated with one or more assets. For example, during a transition, one or more inputs may be inappropriate or otherwise unsuitable. Accordingly, scene 300 may restrict what the user can do. Moreover and in an implementation, a current behavior set 308 may inform the scene to change to another behavior sets. Changes to a user's experience may be accomplished by switching among respective behavior sets.

Figure 4:
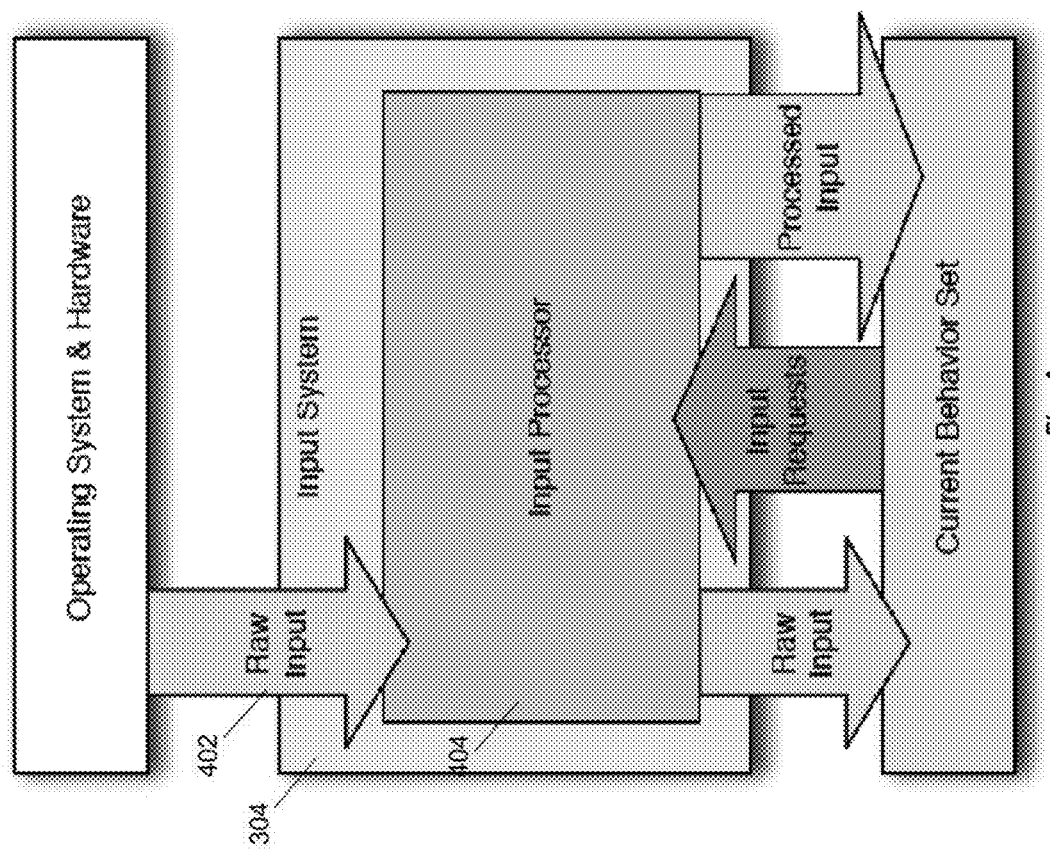
FIG. 4 is a block diagram that illustrates an example input system in accordance with an implementation.

FIG. 4 is a block diagram that illustrates an example input system 304. The input system 304 in accordance with the example implementation shown in FIG. 4, represents an intermediary between computing device's 104 operating system/hardware components and a current behavior set 308. In accordance with the example shown in FIG. 4, input system 304 performs one or more "pre-processing" tasks in connection with a current behavior set 308. For example, input system 304 may recognize a user gesture such as a dragging of the user's finger across computing device's 104 display screen, or listening for audio input from a user using a microphone or other audio capture device associated with computing device 104.

Continuing with reference to FIG. 4, after pre-processed input 402 (shown as "raw input" in FIG. 4) is received, input system 304 may be informed thereof, for example by current behavior set 308. Pre-processed input 402 may be interpreted as a request, such as for a transition trigger, and the current behavior set 308 may inform input system 304 of the request and/or provide additional instruction to input system 304 for responding. For example, the current behavior set 308 would inform input system 304 2 filter for specific input to be used as a transition trigger, or, alternatively, to preclude certain input from being processed. For example, behavior set 308 may instruct input system 304 to listen for the user's words, "I love you." When recognized, a particular transition may be provided. Alternatively, behavior sets 308 may instruct input system 304 to stop listening for the user's words, "I love you." In this example, the instruction provided by behavior set 308 to input system 304 depends upon the particular context of the assets. Once the user says, "I love you" and the respective transition occurs, then behavior set 308 prevents the same transition from recurring in case the user repeats himself or herself. This represents an implementation in which current 8 year set 308 passes one or more instructions to input system 304 in order to have pre-processed input 402 handled in one or more particular ways. In the event that no pre-processing input instructions are received by input system 304, pre-processing input 402 may be passed directly to current behavior set 308.

FIG. 5 is a block diagram that illustrates an example display system 500 in accordance with an implementation. As used herein, display system 500 represents, generally, an object that functions as an intermediary between current behavior set 308 and the computing device's 104 hardware/operating system. Many of the features and capabilities of current behavior set 308 may be provided by display system 500 as a set of common capabilities. For example, the ability to play and control video assets, cross fading between videos and images, and erasing from an image to a video underneath may be provided by display system 500.

In an embodiment, commonly performed tasks are provided substantially automatically so that an individual behavior does not need to often repeated. This reduces a likelihood that the present application will appear to be overly repetitive for a user, and further enhances individual customization and control. For example, many behaviors may involve a fade of video to or from black. Rather than programming each such behavior individually, instructions for such behavior may instead be provided via display system 500. So, rather than the respective behavior set 308 requiring fading its video to black, part of its display output is to provide an instruction something to the effect of: "Display System 500, fade my video to black over the next 4.5 seconds." In the same way other effects, such as erasing from an image to a video underneath may be handled by display system 500. Accordingly, behavior 308 may be playing one video, and it wants to erase to another. It informs display system 500 to, for example, "prepare to erase from my current video to this other video." Accordingly, display system 500 may freeze the current video, adapt it into an image, and begin playing the new video in the background behind it. Behavior set 308 may then instruct display system 500 to, for example, "erase everything within 30 pixels of point 380,490" and display system 500 does so, until at some point behavior's 308 internal criteria are met and either another behavior takes control of the display, or behavior 308 causes some other behavior to occur.

Moreover, display system 500 may also provide current behavior set 308 with an increased functionality. For example current behavior set 308 may be configured by display system 500 to perform custom display operations layered on top of its own capabilities, dynamically.

Figure 6B:
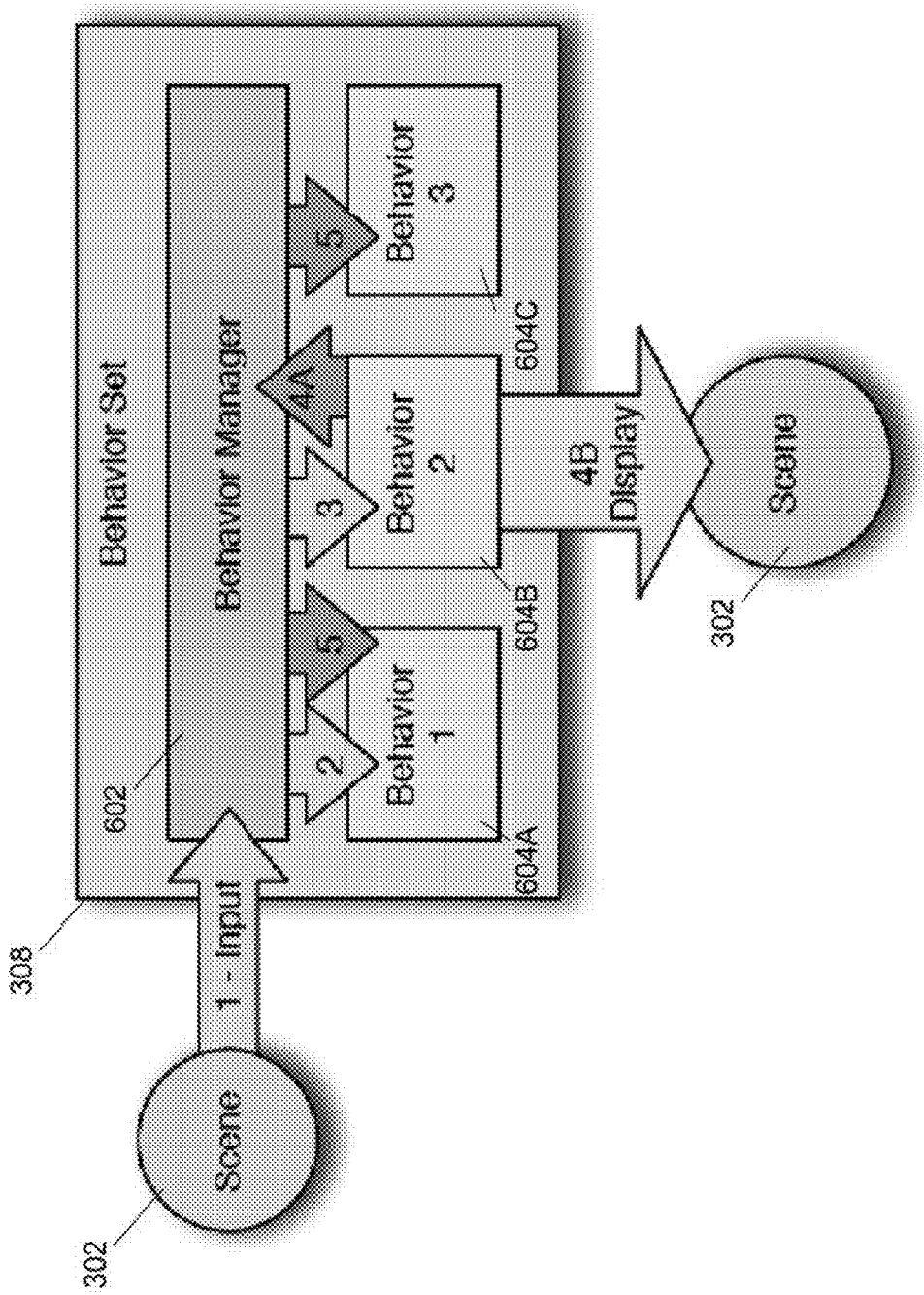
Figure 6C:
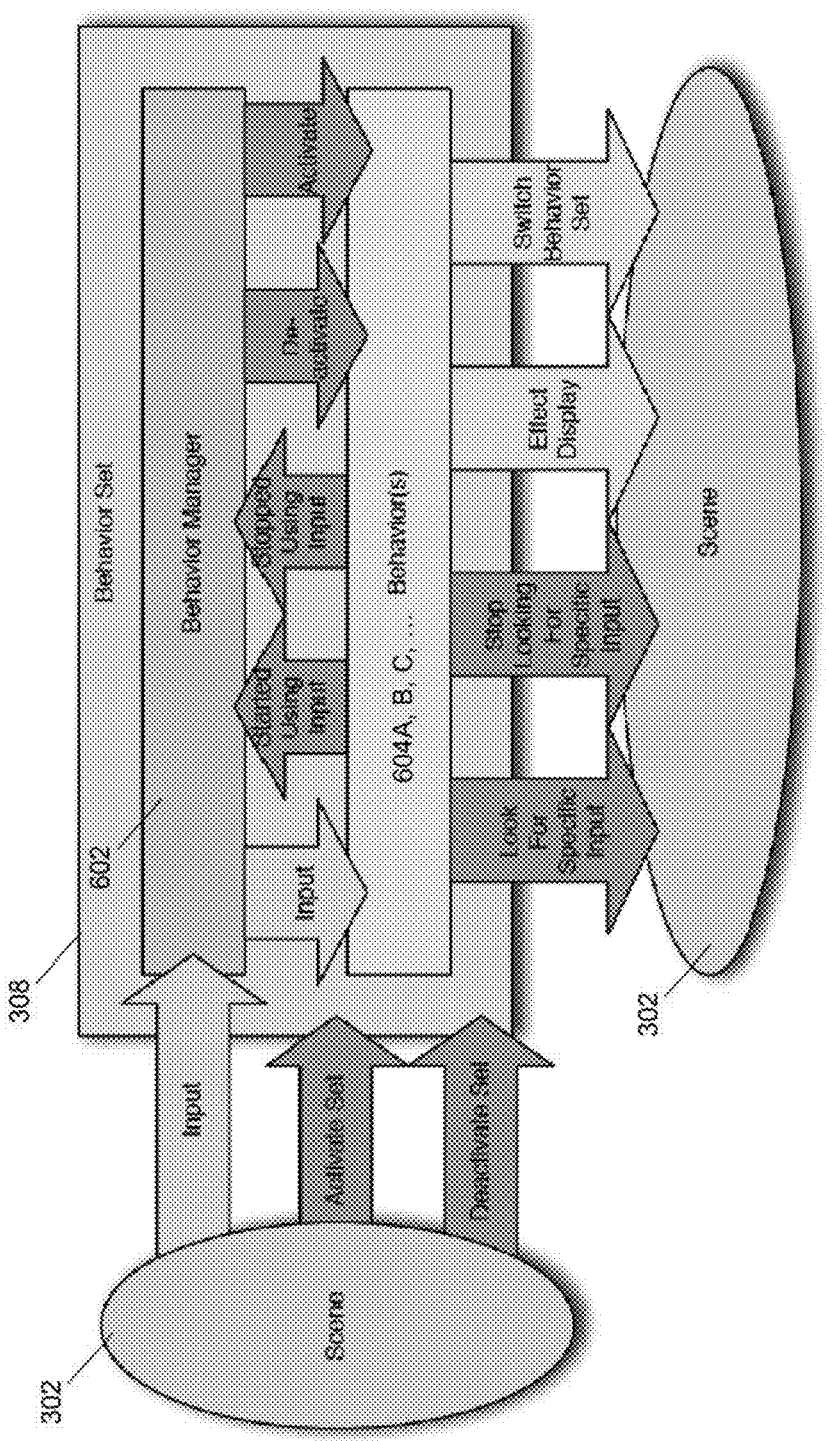

FIGS. 6A through 6C are block diagrams that illustrate a plurality of interactive behaviors in connection with behavior set 308. Although many of the examples and discussion herein relate to behavior set 308 in connection with one or more states of a user's computing device 104, behavior sets 308 are not required by the present application. It is possible for example that some asset is being presented to a user without any interactivity or behavior available therewith.

Continuing now with the example shown in FIG. 6A, behavior set 308 comprises behaviors 604A, 604B and 604C. In an implementation, behavior sets 308 include at least one respective behavior. Follow a transition in response to a transition trigger, an idle is provided which may not require user input. For example, an idle maybe a video loop in a scene 302. Also shown in FIG. 6A, behavior managers 602 is provided for providing functionality associated with behavior set 308.

FIG. 6B is a block diagram and flowchart illustrating steps associated with behavior set 308 routing input 402 from scene 302. In the example shown in FIG. 6B, scene 302 provides input 402 to behavior set 308, which is managed by behavior manager 602, and routed to the first active behavior 604A. In the example shown in FIG. 6B, behavior 604A ignores the input 402, for example, because it is unsuitable or out of context in connection with behavior 604A. Accordingly, behavior manager 602 routes the input 402 to the next available behavior 604B, which accepts the input 402. Once behavior 604B accepts the input 402, it informs behavior manager 602 that it is using the input 402, and proceeds to update the scene's 302 display and audio system 306. In an implementation, and in order to improve efficiency of the present application, behavior manager 602 deactivates behaviors 604A and 604C on the grounds that behavior 604B is using input 402. In the example shown in FIG. 6B, as long as behavior 604B is using any input 402, behavior manager 602 routes input 402 to behavior 604B. Eventually behavior 604B, notifies behavior manager 602 that it is no longer using input 402, and behavior managerial 602 re-activates behaviors 604A and 604C for possible use of input 402.

FIG. 6C is a block diagram and flowchart illustrating steps associated with behavior set 308 instructions and interactions with regard to respective behavior (s) 604A-604C and a scene 302. As illustrated in FIG. 6C, four kinds of interaction are shown: a) scene 302 to behavior set 308; b) behavior manager 602 to behavior(s) 604; c) behavior(s) 604 to behavior manager 602; and d) behavior(s) 604 to scene 302.

Continuing with reference to FIG. 6C and, more particularly, a) scene 302 to behavior set 308 interaction, input 402 is received from the user's computing device 104 and scene 302 sends input 402 to behavior set 308. Behavior set 308 routes input 402 to behavior manager 602. As noted above, behavior manager 602 may function to activate and deactivate one or more behaviors 604 depending upon whether a respective behavior 604 is accepting input 402 and acting thereon. In addition, a plurality of behavior sets 308 may be provided in one or more implementations of the present application, and scene 302 may operate to activate or deactivate one or more behavior sets 308 as scene 302 switches behaviors. For example, as a new transition is selected and provided, scene 302 may deactivate a respective behavior set 308 and activate a different respective behavior set 308 with regard to the different behavior associated with the new transition. The behavior set 308 will in turn deactivate or activate its corresponding behaviors 604 via its respective behavior manager 602.

Continuing with reference to FIG. 6C and, more particularly, b) behavior manager 602 to behavior(s) 604 interaction, input 402 routed from scene 302 is routed by behavior manager 602 to each of its active behaviors 604, one at a time. In one implementation, behavior manager 602 may continue routing input 402 to one or more other active behaviors 604 even though a particular behavior 604 has already had input 402 routed thereto. Thus, behavior manager 602 is not required to deactivate one or more behaviors 604 just because it has routed input 402 to one behavior 604. Alternatively, behavior manager 602 may decide to deactivate one or more behaviors 604 after a respective one behavior 604 has accepted input 402 and is acting thereon.

Continuing with the present b) interaction, when a behavior 604 is deactivated, it is unable to receive input 402 until it is reactivated, such as by behavior manager 602. Moreover, in case a respective behavior 604 requests specific input 402 from the scene and that specific input 402 is received, it passes and instruction or other indication to the scene 302 to stop looking for that specific input 402. When a behavior 604 is activated, such as by behavior manager 602, that behavior 604 receipts input 402. The particular input 402 may have been requested by behavior 604 (e.g. via behavior manager 602). Thus, scene 302 may be instructed or requested to look for specific input 402 and, when received, to pass that inputs to the particular behavior 604 (e.g. via behavior manager 602).

Continuing with reference to FIG. 6C and, more particularly, c) behavior(s) 604 to behavior manager 602 interaction, behavior 604 accepts input 402 and uses input 402 in accordance with the present application, such as to affect the display of computing device 104, switch behavior sets 308, or the like. As noted above, depending upon the context and/or instructions sent to and/or received from behavior manager 602, one or more behaviors 604 may be deactivated by behavior manager 602. At some point, the behavior 604 that is accepting input 402 will it indicate that it is done accepting the input 402, and behavior manager 602 may re-activate one or more other behaviors 604.

Continuing with reference to FIG. 6C and, more particularly, d) behavior(s) 604 to scene 302 interaction, as noted above, scene 302 may be requested to look for specific input 402, such as particular audio input (e.g. specific words or sounds). In addition (or alternatively), scene 302 may be instructed not to look out for the same specific input 402, for example, in case the requesting behavior 604 is deactivated or the specific input 402 has been received. This demonstrates one example of how the present application efficiently manages resources, which contributes to a natural and fluid presentation of assets. In addition to requesting scene 302 to look for and routes specific input 402, behavior 604 may be configured to manipulate one or more assets, such as by adding one or more layers over the top, or the like, in order to control the display and/or presentation of one or more assets.

Adding and manipulating layers represents one way that a particular behavior can impact display, and not display interaction involves merely playing media. For example, if a behavior detects that a user is attempting to interact with it, but does not know the particular interaction, behavior 308 may respond by, for example, fade in a fingerprint image over the top and animate the fingerprint to show the user how to interact. In accordance with the present application, virtually any native feature of a respective device is supported by the present application. Behavior 308 may either make use of display system 500 capabilities provided by the scene, or work at a lower-level with the device capabilities.

In addition, one or more behaviors 604 may be configured to inform scene 302 to change to a new behavior set 308. In response, scene 302 may deactivate the currently active behavior set 308, switch to a new behavior set 308, and activate that behavior set 308.

Although many of the examples and discussion herein relate to idles and transitions as separate and distinct, the invention is not so limited. Both idles and transitions may be provided or treated as the same type of object: a behavior 604.

The present application is now further described with reference to FIGS. 7A-7F and demonstrating an example usage of the present application.

FIG. 7A illustrates an example behavior set 308 and behavior 1 idle 604A that displays a looping video of a model standing and wearing a jacket. During the playback of this idle, various forms of user input is ignored, such as provided by touch gestures in section 702 of display 500. In the example shown in FIG. 7A, the jacket behavior set 308 ignores various forms of user input, such as illustrated in FIG. 7A. As a result, the video of the model standing and wearing her jacket loops.

FIG. 7B illustrates an example behavior 2 which may be a transition resulting in the model removing her jacket to reveal her sweater worn underneath. As shown in FIG. 7B, a user's hand gesturing of two fingers moving apart to trigger the respective transition is recognized by behavior manager 602 and routed to behavior 2 to cause video of the model removing her jacket. As noted above, after behavior manager 602 recognizes the initial user input, user input is routed to behavior 2 and the respective input causes a virtual reaching of a point of no return (e.g. a particular time). as a function of the respective input from the user. The end result is the video changes from behavior 1 idle to behavior 2 transition. After behavior 2 video reaches the end, the application transitions scene 302 to a new behavior: behavior set 308 (displaying the model wearing a sweater).

FIG. 7 C illustrates an example behavior set 308 that and behavior 1 idle 604A that includes video of the model wearing a sweater. In connection with FIG. 7 C, behavior 1 is an idle showing the video of the model wearing the sweater that loops. As described above with regard to FIG. 7A, behavior manager 602 ignores most user input except for specific user input that behavior manager 602 has been instructed to look for. In the example shown in FIG. 7C, behavior 1 represents the looping video idle of the model wearing a sweater.

Referring now to FIG. 7D, once respective user input is recognized, e.g., two fingers moving apart, the input is routed to behavior 2 and as the gesture of the user's two fingers continue to move apart, the video reaches a virtual point of no return (a particular time) and the model removes her sweater to display her shirt underneath. Once the video reaches the end, scene 302 transitions to the next respective behavior set 308 (e.g., blouse).

FIG. 7E illustrates an example behavior set 308 and behavior 1 idle 604A that displays a looping video of a model standing and wearing a blouse and skirt. During the playback of this idle, various forms of user input is ignored, such as provided by touch gestures in section 702 of display 500. In the example shown in FIG. 7E, the blouse behavior set 308 ignores various forms of user input, such as illustrated in FIG. 7E. As a result, the video of the model standing and wearing her blouse loops.

Figure 7F:
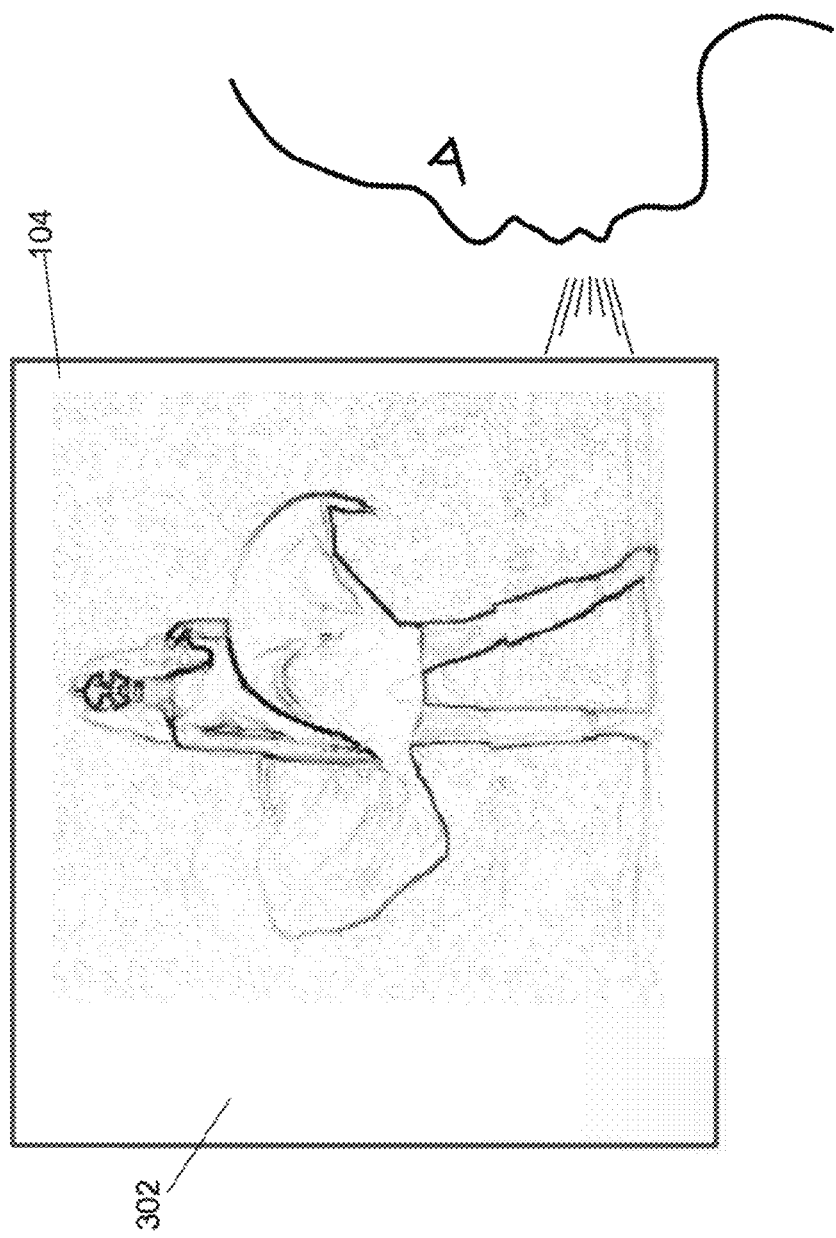

FIG. 7F illustrates an example behavior set 308 and behavior 2 idle relating to the model's skirt blowing in the wind. Behavior manager 602 waits for user to blow on microphone input before triggering this idle.

The examples illustrated in FIGS. 7A-7F demonstrate what a user of the present application may perceive. Each of the states, i.e., the jacket, the sweater, the blouse, represents a set of behaviors (A "Behavior Set" as set forth in FIG. 6A). Behaviors combine particular display output (like playing a video of a model removing her jacket) with input (dragging apart with two fingers). As noted herein, a behavior may not require any user input. For example, each of the behavior sets may includes a behavior to keep the model moving slightly, which represents an idle.

Behavior sets may have a respective behavior manager 602 (FIG. 6B) which determines which behaviors 604 receive input and get to output to the display. Individual behaviors sets vary in both the behaviors they have, and the logic their behavior manager uses.

Continuing now with reference to the Blouse Behavior Set, as the current behavior set, the Blouse's behavior manager 602 logic provides input it receives to each of its behaviors in proper order. If no behavior is triggered by the input, it lets the first behavior (Behavior 1) control the display. Thus, as long as Behavior 2: "Blow Clothes" is not triggered (i.e., it does not respond to the current input) then Behavior 1: "Idle" continues to show a video loop of the model standing and looking demure.

Continuing now with the previous example, the user blows into the microphone.

1) The Scene receives the raw microphone input, and processes it, determining that it is "blow" input and passing it to the current Behavior Set—the Blouse (see FIG. 7E).

2) The Blouse Behavior Set's behavior manager logic gives the input to each of it's behaviors one by one, to see if any of them are triggered by it (see FIG. 6B).

2A) Behavior 1: "Idle" does not care about the input. The behavior manager passes it on to Behavior 2: "Blow Clothes."

2B) Behavior 2: "Blow Clothes" determines from the input that it should activate. It informs the Behavior Manager that it would like control of the display.

3) Behavior manager 602 logic gives control of the display to Behavior 2: "Blow Clothes", and begins routing subsequent input directly to Behavior 2, without passing it to the other behaviors.

4) Behavior 2: "Blow Clothes" begins displaying the video of the model's clothes blowing in the wind.

5) Behavior 2: "Blow Clothes" reaches the end of it's video, and informs the behavior manager that it no longer wants control of the display.

6) The behavior manager returns control of the display to Behavior 1: "Idle", which resumes playing the video of the model standing still.

Thus, as shown and described herein, the present application provides features for multimedia interactivity, including to control video selection and playback, and leverages new tools and interfaces. User input, evaluation for progression and transition of various forms of content, and for selection and display of the content is provided in a convenient, seamless, and intuitive ways.

In addition to providing a system and method for viewing content as set forth herein, the present application further provides a toolset or access to the toolset that enables users to create content and provide for interactive responses established for the player to display.

In an implementation, a toolset is provided that is accessible by content creators either through local software or through a network resource (e.g., a web site) that permits segments to be defined so as to play in a loop (e.g., an idle) until a satisfactory user input is received. The loop may include start and end points that define the beginning and ending of a displayed segment, and the segment-defining module analyze one or more images to assist the human-creator in identifying beginning and ending points that are substantially visually the same. In this way, the beginning can be played after the ending point and the playback will appear substantially seemless. As such, the segment can play indefinitely giving the illusion that it is a longer segment rather than a loop.

Moreover and in an implementation, image enhancement (e.g., computer generated imagery ("CGI")) may be used to bridge beginning and ending points. For example, a frame may be modified such as by raising or lowering parts of the frame for better transitioning. New frames may be inserted to improve transitioning, which are generated by the toolset automatically in accordance with an analysis of surrounding frames.

In addition or in an alternative, the toolset may include transition movements that are pre-defined that establish the user-input criterion (ia) to initiate a transition to a second, third, or further segment. In an embodiment, a graphical user interface ("GUI") is included with the toolset that prompts the user, such as with one or more hints, where scene changes may occur. The prompts may be based, for example, on differences between image frames, audio portions, or other demarcated content portions.

The toolset can include other tools that provide automated responses to other inputs such as the microphone input to cause a segment to transition without further programming required by the human-creator.

Figure 8A:
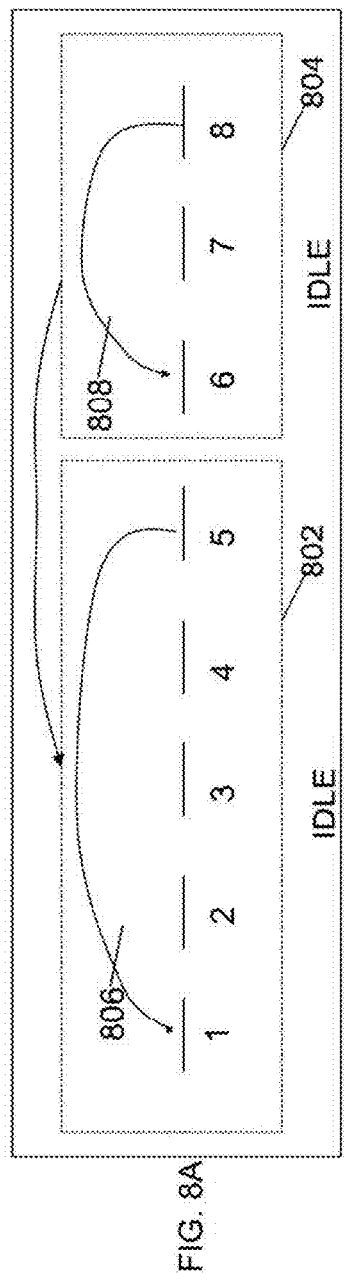
FIGS. 8A-8C are block diagrams that illustrate content creation and example frames of content in accordance with an embodiment of the present application.
Figure 8B:
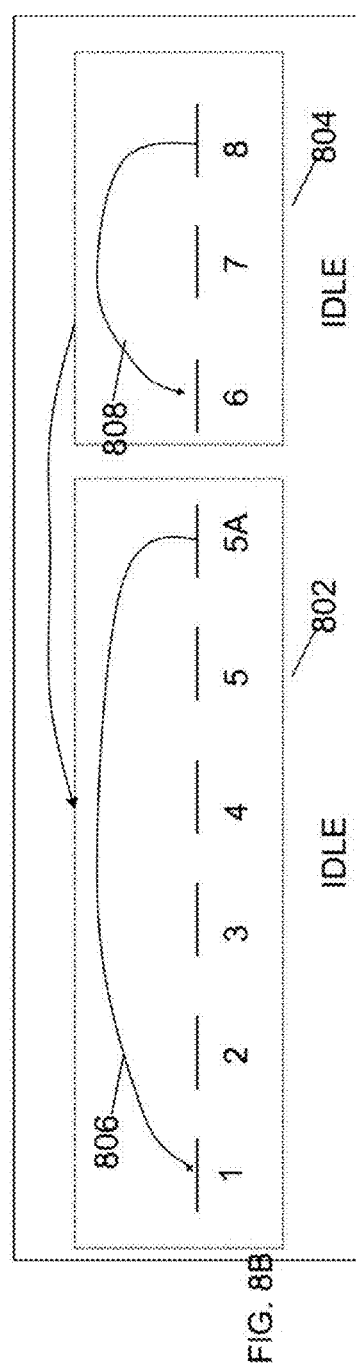
Figure 8C:
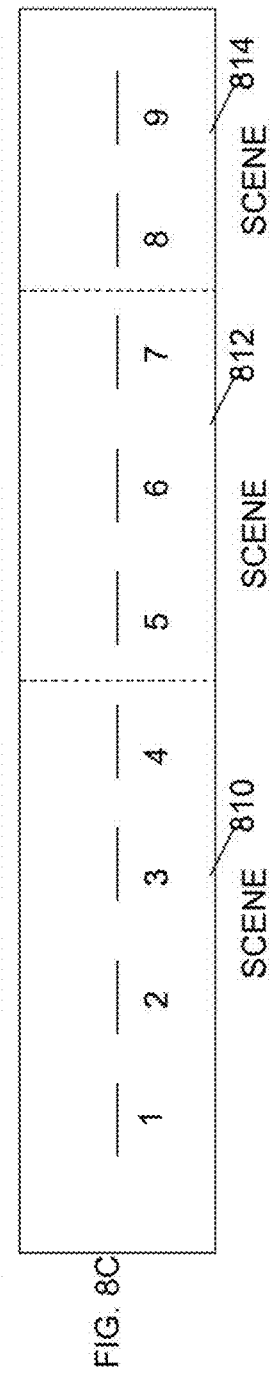

FIGS. 8A-8C are block diagrams that illustrate example frames of content in segmented portions (e.g., idles, transitions or the like) and provided in a GUI set forth in a content creation toolset.

Referring now to FIG. 8A, two idles 802 and 804 are displayed that include five frames of content (1-5) and three frames of content (6-8), respectively. The examples illustrated in FIGS. 8A-8C are for illustration purposes and one skilled in the art will recognize that many more frames of content may be provided. Continuing with reference to FIG. 8A, idle 802 may be, for example, blouse idle and idle 804 may be, for example, blow skirt idle, substantially as described above. When opened in the toolset, the total content (e.g., frames 1-8) may be continuous and without any demarcation of scenes, idles or the like. In an implementation, the content (e.g., frames 1-8) is analyzed automatically to detect respective transition points in the content. The detection process may review each frame in context with one or more adjacent (before and after) frames to identify similarities and/or differences and to define respective segments. The segments may be provided by the content provider in connection with idles, transitions or the like. As shown in FIG. 8A, idle 802 includes five frames 1-5. During playback of idle 802, process 806 loops back from frame 5 to frame 1. Upon receiving particular user input, such as blowing on to a microphone, the content transitions from idle 802 to idle 804 for example in response to some user input. Idle 804 may loop from frame 8 back to frame 6 a predetermined number of times, and/or may terminate and transition back to idle 802, such as illustrated in FIG. 8A.

FIG. 8B displays idles 802 and 804, and includes an additional frame 5A in idle 802 that is generated by the toolset, such as described above. Frame 5A may be a copy of an existing frame (e.g., frame 2, frame 4 or the like). Frame 5A may be further be a modified copy of an existing frame, such as a modified frame 1, frame 5, which is altered to improve transitioning back to frame 1 or to frame 6 (idle 804). For example, frame 5A may be a copy of an existing frame that is modified, such as by raising or lowering parts of the frame, for better transitioning. In yet another alternative, frame 5A may be entirely new and generated, such as via CGI or other suitable technology.

FIG. 8C represents example content that includes nine frames (1-9), and that has been analyzed to include three scenes 810, 812 and 814. As noted above, after content is loaded in the toolset, an analysis may take place that results in a determination that a plurality of scenes were included in the frames. As illustrated in FIG. 8C, three scenes were detected, for example, based on an analysis of the content frames. For example, the differences between frame 4 and frame 5 resulted in a determination of the existence of scene 810 and scene 812, and the differences between frame 7 and frame 8 resulted in a determination of the existence of scene 812 and scene 814. Alternatively (or in addition), other and possibly surrounding frames (e.g., frames 2 and 3) may also be examined in determinations of various scenes.

In one or more implementations, information regarding end-user behavior may be accessed and used in connection with designating scenes, idles, or the like. For example, content that is loaded into the toolset may include ten scenes (scenes 1-10). It may be evident, based upon determined end-user behavior or other suitable data analysis, that a user will desire to view scenes 1-5 in sequence, and then jump to scene 9 and bypass scenes 6, 7 and 8. Accordingly, the toolset may insert one or more frames (e.g., Frame 5A, FIG. 8B), to provide for a smooth and natural-looking transition from scene 1 to scene 9. This provides an intuitive and useful way to ensure that transitions occur smoothly and naturally, even between non-adjacent scenes and based upon pre-determined possible end-user behavior.

Thus, and as illustrated in FIGS. 8A-8C, one or more implementations of the present application includes a toolset for formatting and distributing content for content providers, conveniently and substantially automatically. After scenes are recognized and/or defined, such as to provide idles, transitions or the like, content may be formatted for distribution and is usable in accordance with the teachings herein.

One skilled in the art will recognize that preparing and formatting content in accordance with a toolset, such as described above, represents sophisticated content creation tool that goes beyond, for example, a simple "fade-to-black," morphing, or other known transitioning procedures. The toolset provides for complex determinations and image modifications to ensure realistic and smooth transitions as users interact with the content.

Although the present invention has been described in relation to particular embodiments thereof, many other variations and modifications and other uses will become apparent to those skilled in the art. It is preferred, therefore, that the present invention not be limited by the specific disclosure herein.

What is claimed:

1. A system for preparing content for presentation, the system comprising:
   non-transitory processor readable storage media;
   at least one processor that is operatively coupled to the non-transitory processor readable storage media; and
   multimedia content that includes a plurality of frames and that is accessible by the at least one processor;
   the non-transitory processor readable storage media having instructions that, when executed by the at least one processor, cause the at least one processor to:
   analyze at least two of a plurality of frames of the multimedia content and define a first segment that includes a starting point and an ending point associated with the at least two of the plurality of frames;
   define a second segment of the multimedia content that comprises at least some of the multimedia content not included in the first segment;
   wherein the first segment is configured to repeatedly loop for an indefinite period of time and, in response to detected first user input, continue being presented until the ending point of the first segment is presented,
   wherein, thereafter a single instance of the second segment of the multimedia content in its entirety is configured to be presented, and
   further wherein upon completion of the second segment, a third segment of the multimedia content is configured to be presented for an indefinite period of time.

2. The system of claim 1, wherein the non-transitory processor readable storage media further has instructions that, when executed by the at least one processor, cause the at least one processor to modify at least one transition frame, wherein the modifying results in a smooth transition from a first of at least two scenes to a second of the at least two scenes.

3. The system of claim 1, wherein the non-transitory processor readable storage media further has instructions that, when executed by the at least one processor, cause the at least one processor to:
   associate the first, second and third segments of the multimedia content with a behavior set.

4. The system of claim 3, wherein the behavior set includes at least one of a gesture, audio, and a selection of a graphical control by a user.

5. The system of claim 3, further comprising a behavior manager that identifies user input corresponding with at least one behavior set, and provides respective segments of the multimedia content as a function of the identified user input.

6. The system of claim 5, wherein the behavior manager is configured to filter out user input that does not correspond with the at least one behavior set.

7. The system of claim 1, wherein the first segment of the multimedia content is an idle.

8. The system of claim 1, wherein at least one of the second segment of the multimedia content and the third segment is a transition.

9. The system of claim 1, wherein the first segment and the third segment are the same.

10. The system of claim 1, wherein the starting point includes at least one respective image frame and the ending point includes at least one respective image frame that is substantially similar to the at least one starting point image frame, thereby presenting substantially continuous multimedia content as the first segment loops.

11. A method for preparing content for presentation, the method comprising:
   accessing, by at least one processor, non-transitory processor readable storage media that includes multimedia content, wherein the multimedia content includes a plurality of frames;
   analyzing, by at least one processor, at least two of a plurality of frames of the multimedia content;
   defining, by at least one processor and as a function of the step of analyzing, a first segment that includes a starting point and an ending point associated with the at least two of the plurality of frames; and
   defining, by at least one processor, a second segment of the multimedia content that comprises at least some of the multimedia content not included in the first segment;
   wherein the first segment is configured to repeatedly loop for an indefinite period of time and, in response to detected first user input, continue being presented until the ending point of the first segment is presented, and wherein thereafter a single instance of the second segment of the multimedia content in its entirety is configured to be presented, and
   further wherein upon completion of the second segment, a third segment of the multimedia content is configured to be presented for an indefinite period of time.

12. The method of claim 11, further comprising:
   modifying, by the least one processor, at least one transition frame, wherein the modifying results in a smooth transition from a first of at least two scenes to a second of the at least two scenes.

13. The method of claim 11, further comprising:
   associating, by at least one processor, the first, second and third segments of the multimedia content with a behavior set.

14. The method of claim 13, wherein the behavior set includes at least one of a gesture, audio, and a selection of a graphical control.

15. The method of claim 13, further comprising:
   identifying, by at least one processor, user input corresponding with at least one behavior set; and
   providing, by at least one processor, respective segments of the multimedia content as a function of the identified user input.

16. The method of claim 11, wherein the first segment of the multimedia content is an idle.

17. The method of claim 11, wherein at least one of the second segment of the multimedia content and the third segment is a transition.

18. The method of claim 11, wherein the first segment and the third segment are the same.

19. The method of claim 11, wherein the starting point includes at least one respective image frame and the ending point includes at least one respective image frame that is substantially similar to the at least one starting point image frame, thereby presenting substantially continuous multimedia content as the first segment loops.

* * * * *